United States Patent

[11] 3,624,481

| [72] | Inventor | James A. Macharg<br>16, Elmfield Park, Gosforth, Newcastle-Upon-Tyne, 3, England |
|---|---|---|
| [21] | Appl. No. | 827,182 |
| [22] | Filed | May 23, 1969 |
| [45] | Patented | Nov. 30, 1971 |
| [32] | Priorities | May 27, 1968 |
| [33] | | Great Britain |
| [31] | | 25,323/68;<br>Aug. 27, 1968, Great Britain, No. 40,858/68 |

[54] CONTROLLED-CURRENT BATTERY CHARGERS
26 Claims, 6 Drawing Figs.

[52] U.S. Cl. .................................................. 320/39,
320/1, 320/21, 320/30, 322/22 T
[51] Int. Cl. ................................................. H02j 7/10
[50] Field of Search .......................................... 320/35, 36,
39, 40, 21, 22, 1, 30; 322/22 T

[56] References Cited
UNITED STATES PATENTS

| 3,200,328 | 8/1965 | Green ......................... | 322/22 T |
| 3,239,722 | 3/1966 | Menkis ....................... | 317/142 |
| 3,246,209 | 4/1966 | Multari et al. ............. | 317/142 |
| 3,383,584 | 5/1968 | Atherton ..................... | 320/39 X |
| 3,387,199 | 6/1968 | Billerbeck, Jr. et al. .... | 320/35 |
| 3,412,308 | 11/1968 | Brown ......................... | 320/TD UX |
| 3,443,191 | 5/1969 | Medlar ......................... | 320/40 |
| 3,445,746 | 5/1969 | Delatorre .................... | 320/TD UX |
| 3,447,059 | 5/1969 | Ford et al. .................. | 320/TD UX |
| 3,488,650 | 1/1970 | Muchnick .................... | 323/22 T |
| 3,173,078 | 3/1965 | Farnsworth .................. | 323/22 T |
| 3,510,746 | 5/1970 | Furuishi et al. ............. | 320/TD UX |
| 3,517,295 | 6/1970 | Lapuyade ..................... | 320/TD UX |

Primary Examiner—J. D. Miller
Assistant Examiner—John M. Gunther
Attorney—McGlew and Toren ABSTRACT: A battery charger more particularly for use in charging batteries of the nickel-cadmium type in order to avoid the undesired effects caused by overcharging, wherein a variable reference voltage is derived across a resistor from a constant-current device whose current may be controlled and this derived reference voltage is compared with the terminal voltage existing across the battery being charged, the result of this comparison causing the charging current to be switched off until the battery voltage drops below the reference voltage, whereby the state of charge of the battery is sensed through the ON/OFF ratio of the charging current and appropriate adjustments may be made to the reference voltage in order to achieve a substantially complete charging of the battery in the minimum time without any overcharging occuring.

CONTROLLED-CURRENT BATTERY CHARGERS

The present invention relates to battery chargers.

Hermetically sealed batteries of the nickel-cadmium type have certain undesirable characteristics. These are as follows:

1. Overcharging can result in severe internal damage, and in extreme cases even explosion. In an open or vented cell gassing can produce drying up of the electrolyte, with eventual cell failure, thus calling for "topping-up" of the cell.

2. At elevated temperatures "thermal runaway" can occur during charging, particularly if sintered electrodes are employed.

3. The state of charge cannot be readily ascertained by other means than deliberate measured discharge, for the battery voltage is substantially constant.

4. At both extremes of temperature there is a greatly increased tendency to gas, with a corresponding increase in the effects mentioned in (1) above.

These undesirable characteristics limit the application of the nickel-cadmium type of battery. Previously two basic forms of charging have been employed. These are:

1. Constant-current charging which gives the quickest rate of charge, but requires a manual switch off or timed switch off at the end of a predetermined period.

2. Constant voltage charging whereby, since the charging current tends to be proportional to the difference in potential between the charging voltage and the voltage of the battery on charge, the current gradually decreases until a point of balance is reached between the internal self-discharge of the battery and the charging current. This method takes much longer since the charging current is gradually decreasing.

It may be desirable to change the reference voltage to compensate for various changes in cell condition which may be sensed by appropriate sensors attached to or built into the cell or battery; for instance, changes in temperature or in free hydrogen concentration, or in internal pressure, or in electrolyte condition.

It is therefore an object of the present invention to obviate partially or wholly the above-mentioned undesirable characteristics by providing an entirely new technique in battery charging which is particularly advantageous for use in charging batteries of the nickel-cadmium type.

According to the present invention there is provided a battery charger including means for deriving a reference voltage, means for comparing said reference voltage with the actual voltage of the battery being charged, and means operable from said comparator means to switch off the charging current when the battery voltage reaches the reference voltage and to switch on the charging current when the battery voltage falls below the reference voltage, whereby the state of charge of the battery is sensed through the ON/OFF ratio of the charging current.

Means may be provided to derive a second and higher reference voltage herein after referred to as "the control voltage" which may be used as a control voltage for a constant-potential charging supply.

Means may be provided for limiting the reference voltage and control voltage when the battery temperature rises. Preferably said means comprise one or a pair of temperature-dependent resistances in the reference voltage circuit to effect the limitation on the reference voltage and control voltage.

Means may be provided for increasing the effect of the said temperature-dependent resistances.

Means may be provided for the effect of the said temperature-dependent resistances to control the charging current, and said means may itself be temperature dependent so as to reduce the charging current at low extremes of ambient temperature.

Means may be provided for controlling the said reference voltage and control voltage according to either or both of the rates of rise and fall of battery voltage after charging current has been applied or disconnected respectively.

Further, the present invention provides for the design of a universal "control heart," by which any battery charger can be controlled being readily adjusted to suit any type, or voltage, or capacity of battery, which need not be only of the sealed nickel-cadmium variety. Indeed "gassing" of such batteries as the lead-acid type, and hence maintenance will be minimized by the use of the battery charger of the present invention. Such "control heart" may consist of interconnected modules, selected to provide the required characteristics for a particular application.

Since the voltage of nickel-cadmium batteries, and more especially silver-zinc batteries, is remarkably constant, considerable sensitivity of the comparing device is called for, and the reference voltage must be very substantially independent of power supply fluctuations. It must be remembered that large battery systems will take a large current on charge, and since the device switches this on and off, considerable fluctuations from these internal causes may be expected also.

The present invention will now be described in greater detail by way of example with reference to the accompanying drawings, wherein.

Figure 1:
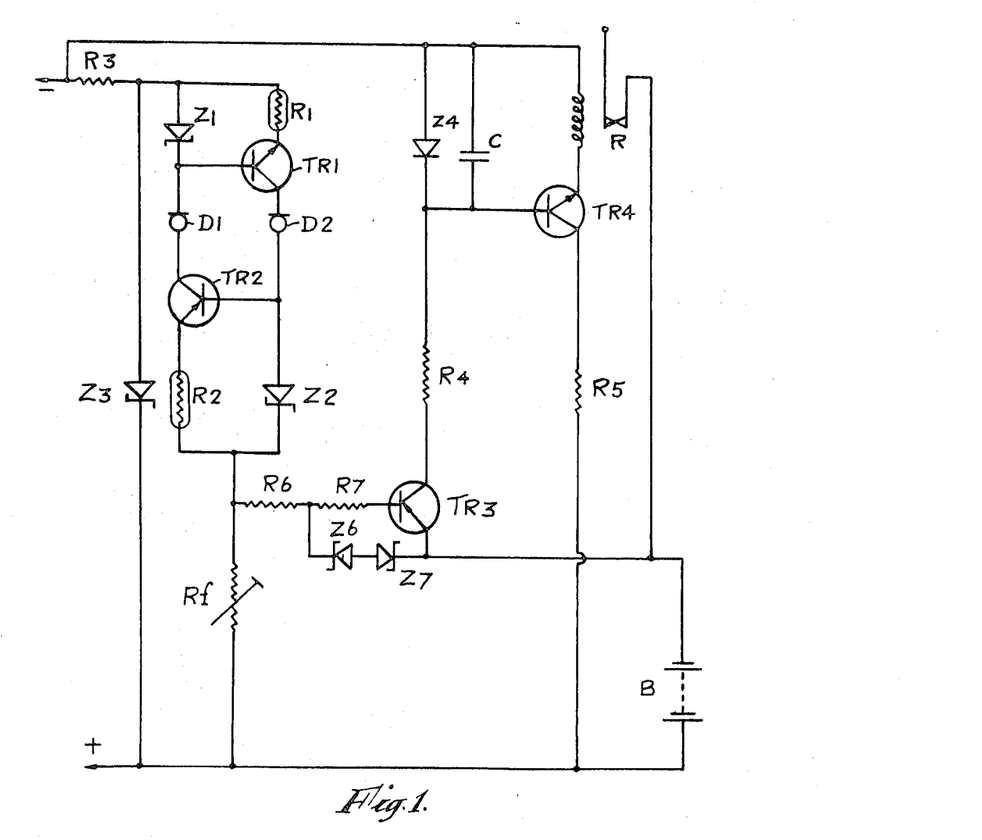
FIG. 1 is a circuit diagram of an elementary form of battery charger for charging batteries of the nickel-cadmium type wherein the ON/OFF ratio may be derived.

Referring first to FIG. 1, a rectified supply of appropriate voltage is applied to the terminals marked + and −. The battery charger includes some form of voltage-stabilizing means, a reference voltage circuit for passing a controlled current through a reference resistance Rf, a voltage comparator device and means for switching on or off the battery-charging current. The voltage reference circuit is a device which passes a controlled current through the reference resistance Rf, the reference voltage being, according to Ohm's Law, the product of the current and the resistance. In this way, a variable-reference voltage is provided without the use of a potentiometer, since some current must inevitably be drawn from the device as a whole. The device is essentially a constant-current device whose current may be reduced by external means below a certain level but not increased above it, so providing a certain maximum reference voltage across the reference resistance which may be reduced by external means as the battery temperature rises. A known type of circuit which may be used to derive the reference voltage is a pair of complementary constant-current circuits wherein the major current path through one provides a constant current for the zener diode in the other and vice versa: This circuit is known as a "ring of two." The voltage reference circuit comprises the transistors TR1 and TR2, the resistors R1 and R3 and the Zener diodes Z1 and Z2 forming a "ring of two" whose symmetrical halves are separated by the current-limiting diodes D1 and D2. The Zener diodes hold the base electrode potentials of the respective transistors constant. The resistors R1 and R2 are temperature-dependent resistors in the emitter electrode leads of the respective transistors which in effect have a fixed voltage across them governed by the Zener diodes Z1 and Z2. The current in each transistor is individually controlled by the resistance of the respective resistors R1 and R2, which are remotely mounted from the device but in good thermal conductivity with the battery being charged. The diodes D1 and D2 limit the current through the transistors to the maximum required value at say 25° C., the current through the diode D1 also feeding the Zener diode Z1 through the transistor TR2 and the diode D2 also feeding the Zener diode Z2 through the transistor TR1. When, owing to rise of temperature, the resistance of the resistors R1 and R2 reduce the current through the transistors TR1 and TR2 to below the limiting value of the diodes D1 and D2, each half then stabilizes the other, the total current drawn remaining very constant yet controllable by the resistors R1 and R2 up to a maximum determined by the diodes D1 and D2.

The reference voltage is applied to the base electrode of a comparator transistor TR3 whose emitter electrode is connected to the battery B in such fashion that current tends to flow through the transistor when the battery voltage is lower than the reference voltage. The collector circuit of this transistor contains in series a high-value resistance R4 which acts as a current-limiting device, and a capacitor C having a Zener diode Z4 across it to limit the voltage reached when the transistor TR3 passes current, slowly charging the capacitor C through the resistance R4 which resistance could be substituted by a current-limiting diode. The voltage across the capacitor C is applied to the base of a further transistor TR4 in emitter-follower configuration, the load being the coil of a relay R. The Zener diode Z4 then effectively prevents the rated coil voltage of the relay R from being exceeded.

The comparator transistor TR3 has a series of protective elements in its base-emitter circuit to prevent damage should a battery be connected when the reference voltage is severely maladjusted. These protective elements comprise resistors R6 and R7 and Zener diodes Z6 and Z7.

A resistor R5 is provided in the collector circuit of the transistor TR4 to reduce the power dissipation within the transistor. The resistor R5 may be substituted by a current-limiting diode. The object of the capacitor C is to reduce the ON/OFF cycling rate of the charging device and so prolong the life of the relay R. When the capacitor C is charged up to the pull-in voltage of the relay R, the relay is energized and the closing of its contacts completes the charging circuit to the battery B.

In operation, the reference voltage may be adjusted by switching on the supply with a high-resistance voltmeter connected to the output terminals before the battery is connected to them: since little current is drawn by the voltmeter there will be little voltage drop across the base-emitter junction of transistor TR3 and the protective elements in series with base electrode.

The battery is connected in circuit with the charging device and the supply switched on. Initially the relay R is deenergized so that no charging current will flow when the battery is connected. The resistor R3 and Zener diode Z3 provide a stabilized supply to the reference voltage circuit. Initially, the voltage across this circuit is high as the voltage reference circuit does not conduct, so that the base electrode of the transistor TR3 is at approximately zero volts. When the reference voltage circuit conducts, the current flowing in the reference resistor Rf causes the voltage on the base electrode of the comparator transistor TR3 to become negative which enables the transistor to conduct. The capacitor C starts to charge up to the voltage at which the Zener diode Z4 breaks down and limits any further increase. The transistor TR4 conducts when its base electrode is increased to a sufficiently positive value and the relay R is energized to close its contacts. The battery is now charged up until either:

1. The voltage across the battery B exceeds the reference voltage which causes the transistor TR3 to switch off and thus deenergize the relay R, or 2. One or both the temperature-dependent resistors R1 and R2 becomes heated by the battery being charged. Their resulting increased resistance lowers the current through the reference voltage circuit thus causing the transistor TR3 to become blocked to deenergize the relay R.

Figure 2:
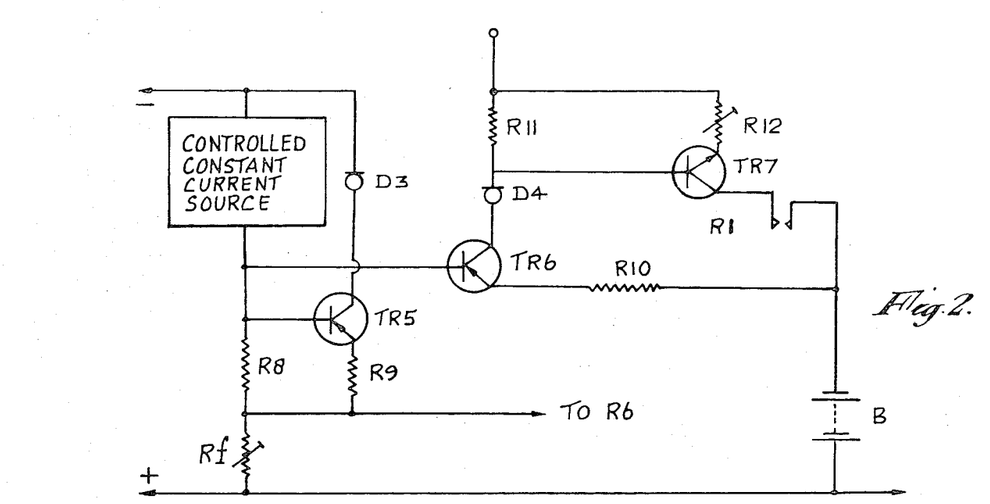
FIG. 2 is a circuit diagram of a development of the circuit shown in FIG. 1 for charging batteries of the nickel-cadmium type.

An additional Zener diode may be provided either in the collector circuit of the transistor TR3 or in the base circuit of the transistor TR4. This Zener diode provides a delay in the control voltage to the relay R, since the breakdown voltage must be exceeded before the relay can be energized.

for the sake of clarity, means for increasing the effect of the temperature-dependent resistances and means for providing their effect to control the charging current will now be described in greater detail with reference to FIG. 2.

The effective sensitivity of the temperature-dependent resistances is increased by inserting a further resistance R8 between the current device and the reference resistor. This resistor is then used as a sensing resistor across which changes of current due to the effects of battery temperature upon the resistance R1 and R2, provide proportional changes of potential. The base-emitter junction of a further transistor TR5 is connected across this resistor, its collector being connected through a current-limiting diode D3 to the negative supply line. The value of the resistance R8 is such that the transistor TR5 is biased so as to be just saturated and to just saturate the current-limiting diode D3 at normal temperatures. The diode current, through the emitter electrode of TR5, augments the current from the constant-current device.

When the current is lowered by a change of temperature, the voltage across the resistor R8 is correspondingly decreased, the transistor TR5 approaches the point of current cutoff, and its augmenting current is reduced, so reducing the total current through the reference resistance much more rapidly than the current supplied by the constant-current device.

A resistance R9 is inserted in the emitter lead of the transistor TR5 to control the sensitivity of the augmenting device by negative feedback. The charging current is reduced at extremes of temperature by again using the voltage changes across the resistance R8 as the controlling basis, being applied to a further transistor TR6.

Since it is not desirable for the current of this transistor to pass through the reference resistor Rf, its emitter is returned to the negative terminal of the battery, again through a sensitivity-controlling resistor R10. The collector of this transistor is taken through a current-limiting diode D4, and a resistance R11 to the negative supply line.

The voltage changes across R11 are applied to the Base-emitter junction of a power transistor TR7, which has a current-controlling resistance R12 in its emitter. The collector of this transistor is connected to the negative terminal of the battery through the contacts R of the relay shown in FIG. 1.

Owing to the similarity of the transistors TR5 and TR6 and their associated circuitry, if convenient, the emitter of transistor TR6 may be connected to the reference resistor Rf and the transistor TR5 and its associated components may be omitted. This course may not be convenient if voltage control and current control require different degrees of sensitivity, as can occur between batteries of the same type but from different manufacturers.

The transistors TR5 and TR6 have their maximum current limited by the diodes D3 and D4 respectively, so that increasing their temperature has little effect upon their currents. However, reducing the temperature of the transistors tends to reduce their currents, hence reducing the reference voltage and the charging current respectively, and advantage is taken of this by ensuring their good thermal contact to a suitable mass which tends to remain at ambient temperature. Thus at low ambient temperatures additional control is obtained in order to satisfy battery requirements.

The resistance R8, the transistors TR5 and TR6 and their associated components, because of their positioning in the circuitry, may be produced as optional extras to the basic charging circuit, and be encapsulated in a separate module or modules.

The battery charger described in FIG. 1 is a voltage-controlled device. It will be noted that raising the reference voltage increases the charge period, but in the extreme case the charge will not be terminated if the reference voltage is too high. Since the charge is recommenced each time the battery voltage drops, and there is thus a repeating cycle at end of charge, there is an average current produced after nominal termination. This average current is determined by the lengths of the "ON" and "OFF" periods.

Once the battery has reached the reference voltage and the charger has once switched off, the "ON" period tends to be constant, due to the time taken for the capacitor C to become discharged and hence for the relay R to drop out. On the other hand, the "OFF" period depends upon the time taken for the battery voltage to drop low enough for the transistor TR3 to conduct again. This time depends upon how fully charged the battery has become, and after the first switch-off it may be a relatively short period, gradually lengthening as the battery becomes more fully charged. Once switching has commenced, there is thus an average current which is gradually reducing, until a state of equilibrium is reached.

However, if the first switch-off is to be delayed in order to speed charging, the reference voltage must be raised to a level which may provide too high a residual average current during switching at end-equilibrium.

Figure 3:
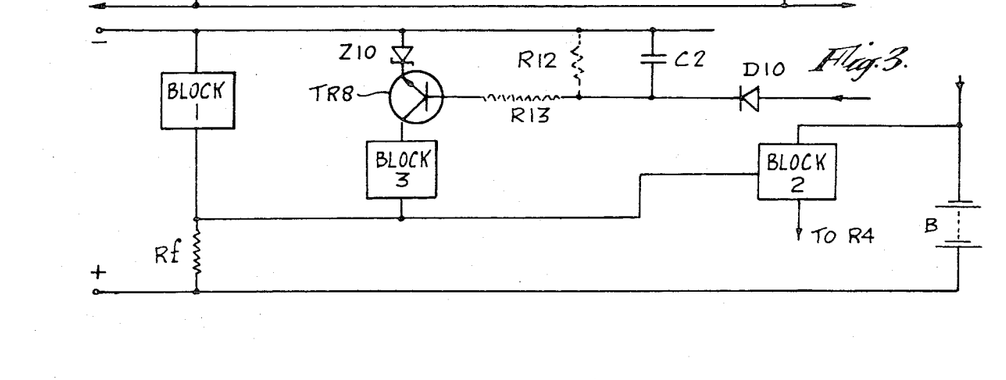
FIG. 3 is a circuit diagram partly in block form of one form of device in which the ON/OFF ratio is utilized.

Referring now to FIG. 3, the block 1 is a schematic representation of the constant-current source, which may include the temperature-sensitive and amplifying devices earlier described, and block 2 is the comparator transistor and associated circuitry, both as described in FIG. 1. Block 3 is a second constant-current device, which may be for example a constant-current diode, connected effectively in parallel with the block 1. A transistor TR8 is connected in series with the block 3 to act as a switch. When the base-emitter voltage of the transistor TR8 is high enough for the transistor to conduct, the original current from the block 1 is augmented by the current from the block 3 to provide a higher reference voltage across the reference resistance Rf. When the transistor TR8 is cut off, only the current from the block 1 flows in the reference resistor Rf, so providing a lower reference voltage.

The transistor TR8 has across its base-emitter junction a capacitor C2, shunted if necessary by a resistor R12 to increase its rate of discharge, or having a resistor R13 in series with the base terminal to reduce its rate of discharge. The capacitor C2 is charged through a diode D10 from a convenient point in the circuit when the charger is in the "ON" state. Such a point may be for instance the base of the transistor TR4, or the switched side of the relay contacts, or even a further set of contacts on the relay. However, the preferred point for simplest circuitry and lowest component cost is the emitter electrode of transistor TR4, which provides a good low-impedance source.

In operation, if the capacitor C2 discharges before its charging pulse from the next "ON" state is repeated, the augmenting current of the block 3 is cut off by the transistor TR8, and the reference voltage is reduced in proportion to a lower stable value. In order to ensure a more complete cutoff of the augmenting current, the transistor TR8 may have a Zener diode Z10 in its emitter circuit whose breakdown voltage must be exceeded if the transistor TR8 is to conduct.

When it is desirable to change the reference voltage to compensate for various changes in cell condition above referred to, a multiplicity of devices similar to block 3 with transistor TR8 may be used. The reference voltage may be raised or lowered by a fixed proportion according to the way in which the transistor is biased by a voltage derived from the appropriate sensor.

Alternatively, an overriding voltage may be applied to one or both of the resistances in the emitter leads of the transistors in block 1, or in block 3, or in any multiplicity of block 3, in order to change the reference voltage.

Figure 4:
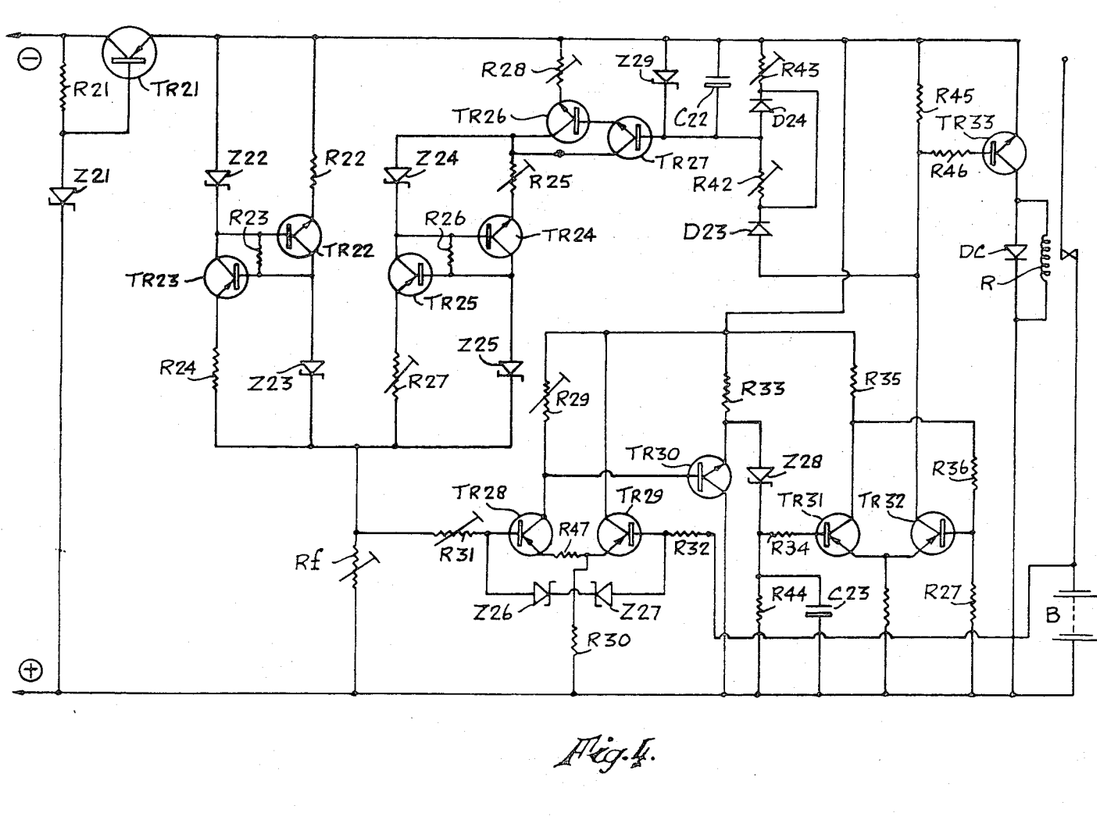
FIG. 4 is a circuit diagram of a preferred form of battery charger for charging batteries of the nickel-cadmium type.

Referring now to FIG. 4, it will be seen that the circuit is a rather more elaborate version of the FIG. 3 circuit. A transistor TR21, resistor R21 and Zener diode Z21 together form a simple semi-stabilized voltage supply which is necessary in view of the sudden changes of current in the various parts of the circuit. The reference voltage circuit is in two parallel parts each part forming a "ring-of-two" constant current device. The first part of the voltage reference circuit includes transistors TR22 and TR23, resistors R22, R23 and R24, and Zener diodes Z22 and Z23. The second part of the voltage reference circuit includes transistors TR24 and TR25, resistors R25, R26 and R27 and Zener diodes Z24 and Z25. This second "ring-of-two" constant-current device provides the additional current necessary to raise the reference voltage.

The second "ring-of-two" constant current device is fed from the main DC stabilized supply through transistors TR26 and TR27. The transistors TR26 and TR27 together with a resistor R28 form a sensitive device whose current is controlled by the voltage across a capacitor C22 and limited by a Zener diode Z29. The resistor R28 functions so as to apply negative feedback to the composite pair of transistors TR26 and TR27, thus tending to make the current passed into the second "ring-of-two" a function of the voltage across the capacitor C22.

The reference voltage which is developed across the resistor Rf is applied to the base electrode of a transistor TR28 via a resistor R31. The battery terminal voltage is applied to the base electrode of a transistor TR29 via a resistor R32. The transistors TR28 and TR29 form a differential pair for comparing the reference voltage and the battery terminal voltage. Zener diodes Z26 and Z27 are connected in series opposition (i.e. back to back) across the base electrodes of the differential pair. These two Zener diodes together with the resistors R31 and R32 form a protective device to ensure that in the event of short-or-open circuit of the charger terminals, or the application of a battery of grossly incorrect voltage, the reverse base voltages of the transistors TR28 and TR29 are not exceeded. The rest of the differential pair includes a common emitter-resistor R30 and a variable resistor R29 in the collector circuit of the transistor TR28.

The base electrode of a transistor TR30 is connected to the collector electrode of the transistor TR28. A resistor R33 in series with the emitter-collector path of this transistor form a simple emitter follower stage for supplying a low-impedance source to the following stage. The output from the emitter follower stage is applied to the base electrode of a transistor TR31 via a Zener diode Z28 and resistor R34 in series. The transistor TR31 together with a transistor TR32 and the resistors R34 to R36 form a Schmitt trigger which acts as a level-sensitive switch. The transistor TR32 is the "control" transistor of the Schmitt trigger which switches On into the conducting state or OFF into the nonconducting state very rapidly. A resistor R44 bypasses the leakage current of the Zener diode Z28 to the positive supply terminal. A capacitor C23 is included in the base circuit of the transistor TR31 in order to slow up the rate of change of input voltage to the Schmitt trigger so preventing it from reaching an unstable equilibrium state. The output from the collector electrode of the transistor TR32 is applied to a resistor R45 which forms the load of the transistor TR32 and to the anode of diode D23. When there is an output across the resistor R45 from the transistor TR32, a transistor TR33 is forward biased through the resistor R46 and it conducts, turning on a relay R.

The diode D23 forms part of a capacitive network whose rate of decay of voltage is compared with that of the battery when the charging current has been cut off. This circuit also includes the capacitor C22, resistors R42 and R43 and a diode D24. The voltage developed across the capacitor C22 controls the sensitive switch formed by the transistors TR26 and TR27.

The operation of the battery charger disclosed in FIG. 4 is briefly as follows: Charging current is applied to the battery after the Schmitt trigger has been switched on. Current flows through the diode D23 and the resistor R43, so reverse-biasing the diode D24. The resistor R43 then forms a part of the load of the Schmitt trigger. The voltage across the resistor R43 is then applied through the resistor R42 to the capacitor C22 which thus receives a degree of charge tending to be proportional to the "ON" period of the Schmitt trigger. In the case where the battery is nearly discharged the "ON" period of the Schmitt trigger is long, the voltage and degree of charge given to the capacitor C22 is limited by the Zener diode Z29, so limiting the loss of voltage to the second "ring-of-two" constant-current device and thus making most use of the supply line voltage. When the battery voltage reaches the reference voltage, the Schmitt trigger is turned "OFF" and the collector electrode of the transistor TR32 returns to the potential of the negative supply line. Under these conditions the diode D23 becomes reversed biased and hence nonconducting, but the diode D24 becomes forward biased and allows the capacitor C22 to be discharged largely by the resistor R43. It should be noted that there is also a leak through the resistor R42, although this leak in practice is insignificant.

The rate of drop of battery voltage is now compared with that of the capacitor C22 as before except that the capacitor C22 has received a charge which tends to be only inversely proportional to the state of charge of the battery, thus magnifying the overall effect. The resistor R28 provides negative feedback to the entire switch thus turning the latter into a current-controlling device of operation graduated by the voltage applied to its input terminals.

While the final drop of reference voltage still depends as before upon the time taken for the capacitor C22 to discharge relative to the time taken for the battery voltage to drop, the reference voltage is itself dropping at a rate predetermined by the amount of charge passed into the capacitor C22 by the resistor R42 and the rate of discharge of the capacitor C22 by the resistor R43, rather than simply being switched to a lower value because the battery voltage did not drop before it did itself. The overall effect of this is to extend the lengthening of the "OFF" period of the Schmitt trigger with continued charging, so allowing the average charging current to reduce further than before, before final cutoff occurs due to complete dropping of the reference voltage.

The embodiment described in FIG. 4 thus has the additional advantage that the danger of hydrogen generation and thermal runaway are further reduced in the later stages of charging the battery, in that when hydrogen is generated the upper reference voltage is reached even more rapidly, the ON time is in consequence further shortened, the capacitor C22 receives less charge and the voltage across it is dropped, so inturn tending to drop the reference voltage to a value at which hydrogen is not generated. If the charging current is so very high that hydrogen continues to be generated, the voltage across the capacitor C22 will not be maintained and the reference voltage will be dropped to the lower level controlled only by the first "ring-of-two," to await settling or discharge of the battery before charging can recommence. With this circuit, the charge applied to the capacitor C22 is an inverse function of the state of charge of the battery.

In the entire device, the transistor TR28 is the only one whose characteristics seriously effect the operation of the circuit, in that its gain affects the comparator sensitivity. A resistor R47 is included in the emitter circuit of the transistor TR28 so as to provide negative feedback to it and so make the sensitivity of the stage less dependent upon the characteristics of this transistor. By varying the resistance of the resistor R31, the overall sensitivity of the stage may be controlled thus deciding how great a sample of the rising and falling battery voltage will be considered by the device. Too large a sample, taking too long a period, will tend to offset the effect of the rapid rise of the battery voltage due to hydrogen generation, and the rate of cycling of the relay may be not too rapid. A very small sample, making maximum benefit of the reduction of "ON" time by hydrogen generation may make relay cycling excessively rapid. This may be obviated by the modified input circuit to the relay driver shown in FIG. 5.

Figure 5:
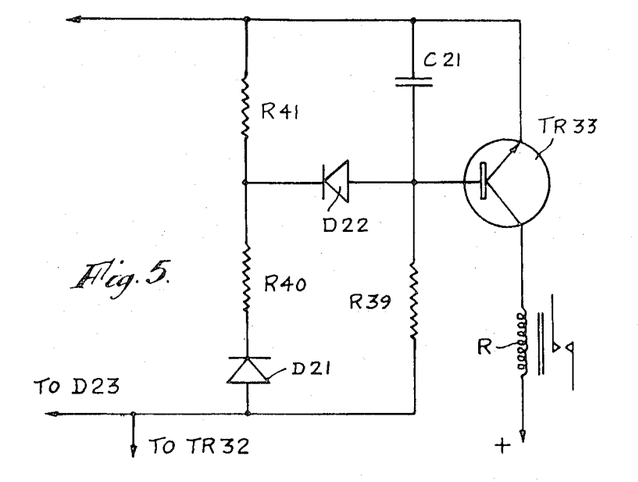
FIG. 5 is a part circuit diagram showing a modified input circuit to the relay driver shown in FIG. 4.

Referring now to FIG. 5, a diode D21 forms part of a fast discharge circuit, the circuit also including a diode D22 and resistors R40 and R41. A resistor R39 and a capacitor C21 provide a time delay for the transistor TR33 whose emitter-collector circuit includes the energizing coil of the relay R. When there is an output from the transistor TR32, the diode D21 conducts raising the voltage across a potential divider formed by the resistors R40 and R41, so that the diode D22 tends to become reversed biased and in consequence tends not to discharge the capacitor C21, whose maximum voltage is limited to that of the base-emitter voltage of the transistor TR33. When there is no output from the transistor TR32, the resistor R41 becomes the load of the diode D22 as it discharges the capacitor C21 which it does much more rapidly than the resistor R39 enables it to be charged.

The relay R now supplies charging current for a shorter period than the Schmitt trigger is in the "ON" state and the resistance of the resistor R42 may be increased in order to reduce the amount of charge given to the capacitor C22 to an appropriate value. This fast discharge circuit may with advantage be embodied into the circuits shown in FIGS. 1, 2 and 3, since the fast discharge of the capacitor ensures that the relay cuts off the charging current from the battery as soon as the terminal voltage from the latter reaches the reference voltage. Without this embodiment, high charging currents will tend to raise the battery voltage too high since the capacitor takes time to discharge and in consequence holds the relay in the "ON" state after the reference voltage has been reached by the terminal voltage of the battery. In the embodiments shown in FIGS. 4 and 5, if the device were to be used in extremes of temperature wherein automatic adjustment of the reference and control voltages with temperature were called for, the temperature-dependent resistances and amplifying devices would be added in the manner already described so as to control the current through the reference resistor.

In a modified form of the circuit shown in FIG. 4 a second reference resistance may be inserted in series with the reference resistor Rf between it and the constant-current devices, in order to provide a slightly higher reference voltage at its negative end which may be used as a control voltage to govern the output voltage of a constant-potential charging source. Such constant-potential charging current would then be controlled in proportion to the reference voltage so that a more steeply tapered current characteristic would be obtained according to the state of charge of the battery, to the increase in the battery temperature, to hydrogen generation and to other effects which may be sensed and caused to control the current which creates the reference voltage.

Once the battery has become fully charged and the reference voltage caused to drop to its lowest limit so as to terminate the charge period, the battery voltage will eventually drop to the lowest limit of the reference voltage due to settling. When this happens a a charging pulse will be applied to the battery, the length of which pulse is a function of firstly the sensitivity of the comparator, secondly the hysteresis of the Schmitt trigger, thirdly of the charging current and fourthly of the state of charge of the battery. This charging pulse will probably not be long enough to charge the capacitor C22 sufficiently to raise the reference voltage significantly, hence it may be difficult to obtain a fully charged state especially where the battery has a large current capacity.

Figure 6:
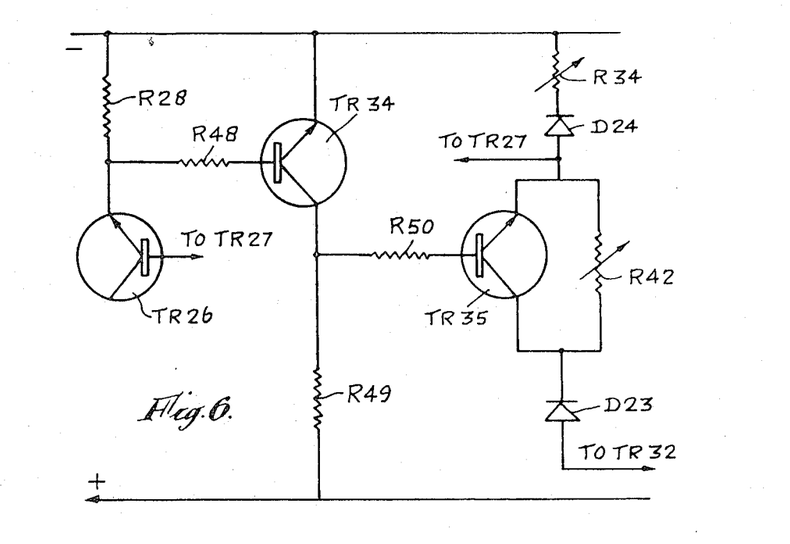
FIG. 6 is a part circuit diagram showing a modified arrangement of the circuit shown in FIG. 4 to ensure that a battery of large capacity is in fact fully charged.

In order to obviate this, a modified arrangement of the basic circuit which is shown in FIG. 6 may be used. This modified circuit includes means for bypassing the resistor R42 when the reference voltage is at its lowest limit, that is to say when only the first "ring-of-two" passes current through the reference resistor Rf. The circuit shown in FIG. 6 includes additional transistors TR34 and TR35 and additional resistors R48, R49 and R50. The transistor TR35 is in parallel with the resistor R42, its base electrode being connected to the collector electrode of the transistor TR34 through the resistor R50. The base electrode of the transistor TR34 is connected to the junction between the resistor R28 and the emitter electrode of the transistor TR26 through the resistor R48.

In operation the resistor R28 senses whether the second "ring-of-two" is conducting. Any voltage developed across the resistor R28 will tend to turn on the transistor TR34 which will then develop a load across the resistor R49, such voltage approaching that of the supply voltage. The transistor TR35 will thus be rendered nonconducting and its emitter and collector terminals will in effect be disconnected from across the resistance R42, hence when the second "ring-of-two" is conducting, the transistor TR35 is ineffective. Conversely, when the second "ring-of-two" is nonconducting, the transistor TR34 is turned off, the base electrode of the transistor is biased away from its emitter electrode and hence conducts, passing any current which may be made available through the diode D23 by the Schmitt trigger. Alternatively the input voltage to the base of the transistor TR34 may be taken from the positive terminal of the capacitor C22 instead of from the resistor R28.

It should be noted that the base current of the transistor TR35 in the latter condition also passes through the emitter circuit and hence tends to charge the capacitor C22. In certain circumstances it may be desirable to offset this current by means of a bleed resistor in parallel with the capacitor C22. Furthermore, it may be desirable to offset the base-emitter voltage of the transistor TR34. This may be achieved by inserting a diode in its base-emitter supply circuit, i.e. in series with the resistor R28.

Throughout this specification the various type of constant-current devices used are interchangeable with not only each other, but with the simpler form of device being a transistor with bias fixed by a Zener diode which so provided a constant potential across an emitter load resistor.

What I claim and desire to secure by Letters Patent is:

1. A battery charger comprising reference means for deriving a reference voltage, comparator means for comparing said reference voltage with the actual voltage of the battery being charged, and switch means operable from said comparator means to switch off the charging current when the battery voltage reaches the reference voltage and to switch on the charging current when the battery voltage falls below the reference voltage, said reference means having a fixed resistance and means including two controllable constant-current circuits arranged in parallel with each other for passing and controlling a variable reference current through said fixed resistance, said reference means further having means including a switch for controlling one of said constant-current circuits.

2. A battery charger as in claim 1, wherein said resistance includes two resistors in series for forming two reference voltages, one of said reference voltages having means for connecting to the battery to supply a constant-potential charging current to the battery.

3. A battery charger as in claim 1, wherein one of said constant-current circuits includes temperature-sensitive means whose resistance rises with increase in temperature, and the other of said constant-current circuits includes current-limiting means to control the maximum current which may be passed.

4. A battery charger as in claim 1, wherein said switch means include means for determining whether or not the one of said constant-current circuits having means with a switch is conducting.

5. A battery charger as in claim 1, wherein one of said constant-current circuits includes temperature-variable electrical means for responding to the battery temperature and changing the current in the one of said constant-current circuits.

6. A battery charger comprising reference means for deriving a reference voltage, comparator means for comprising the reference voltage with the voltage of the battery being charged, and switch means operable from said comparator means to switch off the charging current when the battery voltage reaches the reference voltage and to switch on the charging current when the battery falls below the reference voltage, said comparator means including a differential-pair transistor circuit to compare the variable-reference voltage and the voltage of the battery, said differential-pair transistor circuit having a pair of transistors with base electrodes, connecting circuit means in said comparator means for applying the voltages to be compared to the base electrodes of the transistors, said switch means having a Schmitt trigger responsive to the output of the differential-pair transistor circuit to produce an actuating current when the differential-pair transistor circuit senses that the battery voltage has reached the reference voltage, said switch means including a relay responsive to the actuating current of said Schmitt trigger for cutting off the charging current, and capacitive network means between the output of the Schmitt trigger and the relay for delaying return of said relay to the condition in which it reapplies the charging current.

7. A battery charger, comprising reference means for deriving a reference voltage, comparison means for comparing the reference voltage with the voltage of the battery being charged, switch means operable from said comparison means for switching off the charging current when the battery voltage reaches the reference voltage and for switching on the charging current when the battery voltage falls below the reference voltage, control means responsive to the switch means for forming a signal representing the ratio of the times during which the charging current is on as compared to the times during which it is off as a measure of the state of the charge of the battery, said control means being also coupled to said reference means for varying the reference voltage of said reference means in response to a reduction of the signal so as to cycle the charging current on and off.

8. A battery charger according to claim 7, wherein said control means includes capacitive means for developing the signal in the form of a descending voltage, circuit means in said control means for comparing the rate of drop of the actual voltage of the battery after cutoff of the charging current with the rate of drop of voltage across said capacitive means.

9. A battery charger as in claim 8, wherein said capacitive means includes a capacitor and voltage-forming means, said voltage-forming means applying a voltage to said capacitor during the period when the charging current is applied to the battery and removing the voltage when the charging current is removed from the battery, said control means having regulator means responsive to the voltage across said capacitor for causing said reference means to drop the reference voltage to a lower level when the rate of drop of said voltage across said capacitor is faster than the rate of drop of the voltage across the battery to prevent the charging current from being reapplied to the battery until the terminal voltage of the battery drops to a lower level.

10. A battery charger according to claim 7, wherein said reference means includes a resistor, a constant-current circuit supplying said resistor in order to develop the reference voltage thereacross, and at least one temperature-dependent resistor thermally associated with the battery and connected in the constant-current circuit to reduce the value of the reference voltage with rising battery temperature.

11. A battery charger according to claim 10, including at least one current-limiting diode connected in the constant-current circuit for modifying the effect of said temperature-dependent resistor.

12. A battery charger according to claim 7, wherein said reference means includes a resistor and a constant-current circuit supplying said resistor in order to develop the reference voltage thereacross; said constant-current circuit including a pair of complementary transistors, a pair of Zener diodes and a pair of temperature-dependent resistors; the transistors, Zener diodes and resistors being arranged to form a ring-of-two circuit, said temperature-dependent resistors being thermally associated with the battery so as to reduce the value of the current supplied to the resistor and hence the value of the reference voltage with rising battery temperature.

13. A battery charger according to claim 12, wherein said comparator means includes a transistor, said transistor having a base electrode connected to one end of the resistor across which the reference voltage is developed and an emitter electrode connected to one terminal of the battery, the other end of the resistor and the other end of the battery being connected in common.

14. A battery charger according to claim 7, said reference means including a resistor and a constant-current circuit supplying said resistor to develop a reference voltage, said comparator means including a transistor for comparing said reference voltage with the a actual voltage of the battery being charged; said switch means including a relay for switching the charging current on and off and capacitive network means connected between the output of the transistor and the energizing winding of the relay for creating a delay in the reapplying of the charging current when the battery voltage falls below the reference voltage.

15. A battery charger according to claim 7, said reference means including a resistor, a constant-current circuit including a pair of complementary transistors, a pair of Zener diodes and a pair of temperature-dependent resistors for supplying a current to the resistor to develop the reference voltage; said reference means further including the temperature-dependent transistor thermally associated with the ambient temperature and in parallel with the constant-current circuit, biasing means for biasing said temperature-dependent transistor so as to be normally saturated to augment the current through the resistor across which the reference voltage is developed.

16. A battery charger according to claim 15, wherein said switch means include charging current limiting means controlled by said comparator means to reduce the charging current during the ON periods as charging proceeds.

17. A battery charger according to claim 7, wherein said reference means include a resistor and first and second constant-current circuits supplying said resistor in parallel; said reference means further including a transistor having a base electrode and an emitter-collector circuit, said transistor being in series with the second constant-current circuit, said switch means including means for sampling the ON/OFF ratio of the charging current to thereby control said transistor through its base electrode.

18. A battery charger according to claim 17, wherein the means for sampling the ON/OFF ratio of the charging current include a charging capacitor and means for charging said capacitor; and means for comparing, during the OFF period, the rate of drop of voltage across the capacitor with the rate of drop in battery voltage.

19. A battery charger according to claim 7, wherein said reference means including a resistor, first and second constant-current circuits supplying said resistor in parallel to thereby develop a reference voltage thereacross, a switch in series with the second constant-current circuit, said control means having means responsive to the ON/OFF ratio of the charging current to control the position of the switch, said comparison means including a plurality of transistors forming a differential pair arranged so that one receives the reference voltage and the other the actual voltage of the battery on charge, said switch means including a relay for switching on and off the charging current whose energizing winding is actuated by the output from the differential pair.

20. A battery charger according to claim 19, wherein said switch means includes a Schmitt trigger circuit connected between the output of the differential pair and the energizing winding of the relay.

21. A battery charger according to claim 19, wherein the first and second constant-current circuits each include a pair of transistors; a pair of Zener diodes and a pair of resistors arranged to form a constant-current circuit in each case.

22. A battery charger including a resistor, first and second constant current "ring-of-two" circuits supplying said resistor in parallel for developing a reference voltage; a transistor acting as a switch in series with the second "ring-of-two" a differential pair of transistors arranged so that one receives the reference voltage and the other the actual voltage of the battery on charge; a Schmitt trigger circuit connected to the output from the differential pair; a capacitive network charged from the Schmitt trigger and controlling the transistor in the second "ring-of-two" circuit so as to control whether or not said second "ring-of-two" circuit augments the current flowing in the reference resistor; and a relay having an energizing winding connected to the output from the Schmitt trigger and its contacts in series with the charging current, said capacitive network and said transistor forming sensing means for sensing the state of charge of the battery during charging on the basis of the ON-OFF ratio of the charging current and for continually modifying the ON-OFF ratio as charging progresses to thereby control the charging current.

23. A battery charger according to claim 22, wherein the first "ring-of-two" circuit includes a pair of temperature-sensitive devices which are thermally associated with the battery and whose resistance rises with increase of temperature.

24. A battery charger according to claim 22, including a second capacitive network, a transistor whose emitter-collector path is in series with the energizing winding of the relay, said second capacitive network being connected to the base electrode of the transistor wherein the first capacitive network is caused to charge slowly but discharge quickly.

25. A battery charger according to claim 14, including a diode arranged to be reversed biased with respect to the capacitive network and connected to the base electrode of the transistor which effects the fast discharge of the capacitive network but which is held inoperative while the capacitive network is being charged.

26. A battery charger according to claim 22, including a resistor across which a voltage is developed when the second "ring-of-two" in conducting, and at least one transistor whose state of conductivity is determined by the voltage developed across the resistor, said transistor being connected in parallel with a resistor in series with a capacitor of the capacitive network whereby the transistor acts as a switch to bypass the charging current to the capacitor when the second "ring-of-two" is nonconducting.

* * * * *